The specification in this pat. is not in print.
6258X
W. Manning.
Clover Huller.
Patented Nov. 24, 1830.
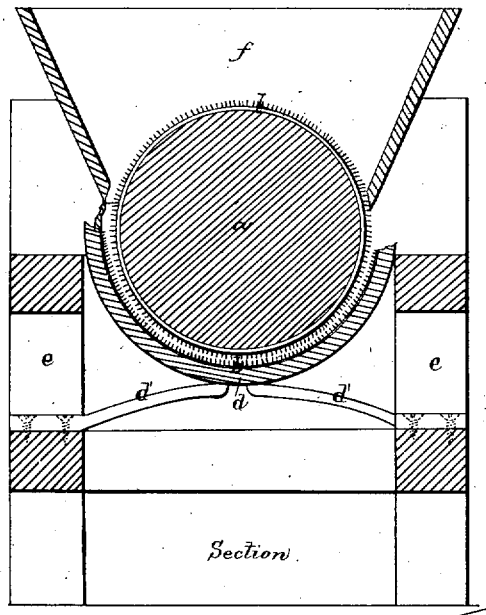
Fig: 4.
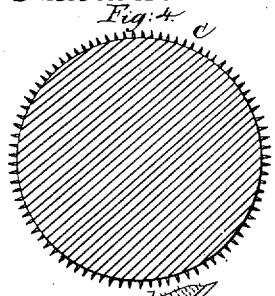
Fig: 3.
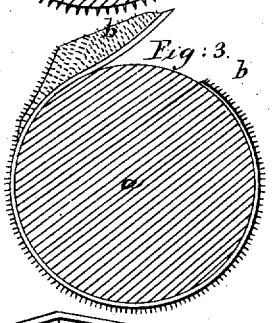
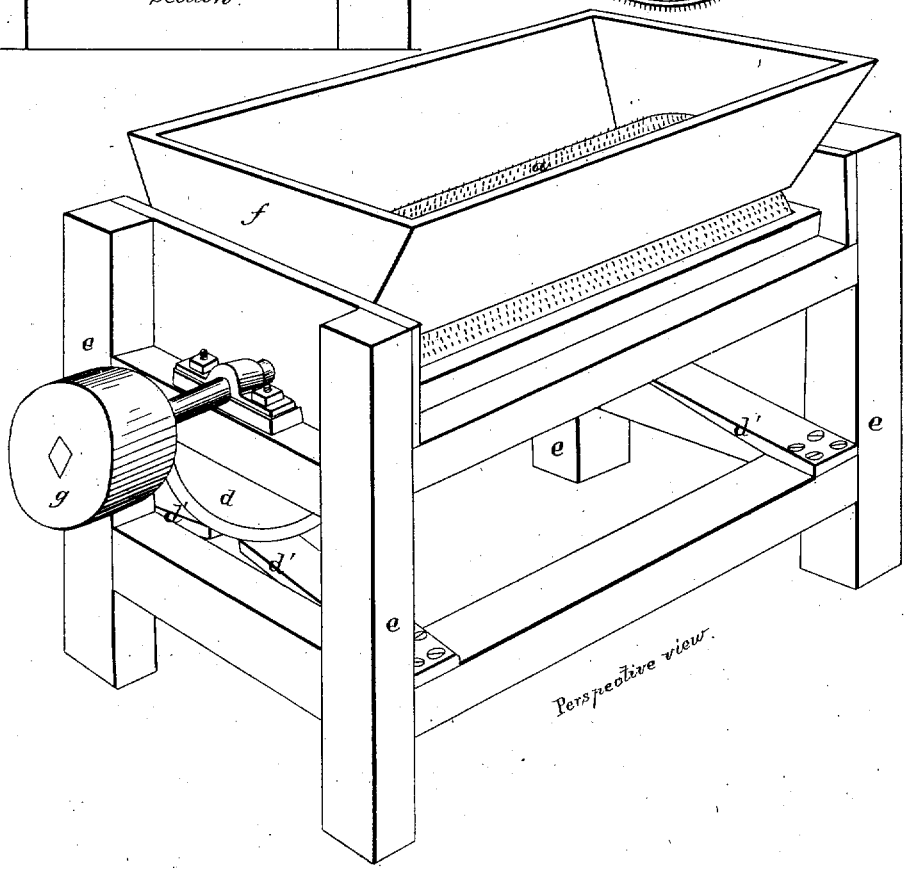
THE NORRIS PETERS CO., PHOTO-LITHO., WASHINGTON, D. C.

X6238 Nov. 24, 1830

William Manning Westfield Township N. Jersey.

Letters Patent

The Schedule referred to in these Letters Patent and making part of the same containing a description in the words of the said William Manning himself of his improvement in a machine for hulling Clover seed, rice, barley and other small Grain.

Be it known that I William Manning of Westfield Township Essex County New Jersey have made an improvement being a machine for hulling clover seed, rice barley and other small grain, which is described as follows. This machine consists of the following principal parts viz. 1. Cylinder. 2. The concave curved bed. 3 The frame. 4 The hopper — 1. The Cylinder is made of wood about two feet long and about one foot diameter and may be either solid or hollow. This cylinder is covered with wire either stuck into the wood or in leather nailed or fastened onto the Cylinder like card fillet ing or it may be covered with nails. 2. The concave curved bed is made of wood and to correspond with the cylinder. and is also covered with wire or nails similar to the cylinder. It forms a half section of the cylinder more or less. There are suitable springs so fixed as to press the bed to the cylinder or the cylinder to the bed. — 3 The frame. consists of four posts with side and end pieces. properly framed and secured together and adapted to support the cylinder &c before described.

4. The Hopper is made of the usual form and placed over the cylinder. Operation. The Clover seed, rice, or barley is put into the hopper over the cylinder. the cylinder is made to revolve on its axis horizontally by means of a crank, pulley, cog wheels, or any other gearing. and is put in motion by animal water or steam power. the seed falls upon the cylinder and is carried by its revolution into the bed where it is hulled and then passes out at the other side.

The invention here claimed and which is desired to be secured by Letters Patent is the mode before described of hulling clover seed, rice,

X6258 barley and other small grain by the revolution of a cylinder in a curved hol-
low bed covered with wire or other teeth. — Further to illustrate my inven-
tion I refer to the model and drawing of the ^same deposited in the Patent Office.
In testimony that the foregoing is a true description of my said invention
I have hereunto signed my name before two Witnesses and made oath to the
same at the City of Washington this 12th day of November 1830

Recd. Witnesses
W.E. Charles Keller
William P. Elliot

William Manning (468 Words)